US010203589B2

(12) United States Patent
Takagi

(10) Patent No.: US 10,203,589 B2
(45) Date of Patent: Feb. 12, 2019

(54) WAVELENGTH CONVERTER, ILLUMINATOR, AND PROJECTOR

(71) Applicant: Seiko Epson Corporation, Tokyo (JP)

(72) Inventor: Kunihiko Takagi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/284,089

(22) Filed: Oct. 3, 2016

(65) Prior Publication Data

US 2017/0097559 A1 Apr. 6, 2017

(30) Foreign Application Priority Data

Oct. 6, 2015 (JP) ................................ 2015-198266

(51) Int. Cl.

| G03B 21/16 | (2006.01) |
|---|---|
| F21V 29/502 | (2015.01) |
| F21V 29/78 | (2015.01) |
| F21V 29/83 | (2015.01) |
| F21V 9/30 | (2018.01) |
| G02B 7/00 | (2006.01) |
| G02B 26/00 | (2006.01) |
| G03B 21/20 | (2006.01) |
| F21Y 115/30 | (2016.01) |
| G02B 27/14 | (2006.01) |

(52) U.S. Cl.
CPC ............ *G03B 21/16* (2013.01); *F21V 9/30* (2018.02); *F21V 29/502* (2015.01); *F21V 29/78* (2015.01); *F21V 29/83* (2015.01); *G02B 7/008* (2013.01); *G02B 26/008* (2013.01); *G03B 21/204* (2013.01); *F21Y 2115/30* (2016.08); *G02B 27/149* (2013.01)

(58) Field of Classification Search
CPC ...... G02B 26/008; G02B 26/00; G03B 21/16; G03B 21/204
USPC ............................................. 353/61; 359/892
See application file for complete search history.

(56) References Cited

U.S. PATENT DOCUMENTS

| 6,618,213 B2* | 9/2003 | Inamoto ................. F04D 17/08 348/743 |
|---|---|---|
| 2006/0066817 A1* | 3/2006 | Chin ..................... G03B 21/145 353/84 |
| 2013/0169938 A1* | 7/2013 | Huang ................... G03B 21/16 353/31 |

(Continued)

FOREIGN PATENT DOCUMENTS

| JP | 2005062691 A | * | 3/2005 | ............. G03B 21/22 |
|---|---|---|---|---|
| JP | 2012-13897 | * | 6/2010 | ............. G03B 21/14 |

(Continued)

OTHER PUBLICATIONS

Machine Translation of JP2012008177A.*
Machine Translation of JP2005062691A.*
Machine Translation of JP2013250422.*

*Primary Examiner* — Steven H Whitesell Gordon
*Assistant Examiner* — Jerry Brooks
(74) *Attorney, Agent, or Firm* — ALG Intellectual Property, LLC

(57) ABSTRACT

A wavelength converter includes a rotating device, a substrate rotated by the rotating device, and a wavelength conversion element and a plurality of fins provided on a first surface of the substrate, and the first surface is so provided as to face an opening of an air introduction channel through which air for cooling the wavelength conversion element is introduced.

23 Claims, 5 Drawing Sheets

(56) References Cited

U.S. PATENT DOCUMENTS

| | | | |
|---|---|---|---|
| 2015/0009685 A1* | 1/2015 | Wang | G03B 21/16 |
| | | | 362/323 |
| 2015/0241046 A1* | 8/2015 | Hagemann | G03B 21/16 |
| | | | 362/84 |
| 2016/0069558 A1* | 3/2016 | Hu | G02F 1/1336 |
| | | | 362/84 |
| 2016/0077326 A1* | 3/2016 | Yamagishi | G02B 26/008 |
| | | | 353/61 |
| 2016/0219256 A1* | 7/2016 | Tsai | H04N 9/3144 |
| 2017/0052434 A1* | 2/2017 | Masuda | G03B 21/16 |

FOREIGN PATENT DOCUMENTS

| | | | | |
|---|---|---|---|---|
| JP | 2012-13897 A | | 1/2012 | |
| JP | 2012008177 A | * | 1/2012 | G03B 21/16 |
| JP | 2013250422 A | * | 12/2013 | G03B 21/16 |

\* cited by examiner

WAVELENGTH CONVERTER, ILLUMINATOR, AND PROJECTOR

CROSS-REFERENCE TO RELATED APPLICATION

The entire disclosure of Japanese Patent Application No. 2015-198266, filed Oct. 6, 2015 is expressly incorporated by reference herein.

BACKGROUND

1. Technical Field

The present invention relates to a wavelength converter, an illuminator, and a projector.

2. Related Art

In recent years, a phosphor is used as an illuminator for a projector.

In the illuminator described in JP-A-2012-013897, the rear surface of a substrate that supports a phosphor is provided with cooling fins. The substrate and the cooling fins are integrated with each other.

The phosphor supporting surface of the substrate receives excitation light directed to the phosphor, and the temperature of the surface therefore tends to increase. In the technology of related art described above, since the heat is transferred to the cooling fins provided on the rear surface of the substrate that supports the phosphor and the phosphor is therefore indirectly cooled, the cooling of the phosphor is undesirably insufficient in some cases.

SUMMARY

An advantage of some aspects of the invention is to provide a wavelength converter, an illuminator, and a projector capable of sufficiently cooling a phosphor.

According to a first aspect of the invention, a wavelength converter is provided. The wavelength converter includes a rotating device, a substrate rotated by the rotating device, and a wavelength conversion element and a plurality of fins provided on a first surface of the substrate, and the first surface is so provided as to face an opening of an air introduction channel through which air for cooling the wavelength conversion element is introduced.

In the wavelength converter according to the first aspect, when the substrate is rotated by the rotating device, the plurality of fins provided on the first surface of the substrate rotate, and air introduced through the opening of the air introduction channel facing the first surface flows along the first surface and directly cools the wavelength conversion element provided on the first surface. As described above, the wavelength conversion element and the plurality of fins are provided on the same first surface, and the opening of the air introduction channel is so provided as to face the first surface, whereby air is allowed to actively flow to the surface of the wavelength conversion element for sufficient cooling of the wavelength conversion element.

In the first aspect described above, a configuration in which at least part of the opening is provided in a position shifted from the wavelength conversion element toward a center of rotation of the rotating device may be employed.

According to the configuration described above, air is introduced to a portion shifted from the wavelength conversion element toward the center of rotation of the rotating device. When the plurality of fins rotate, resultant centrifugal force induces air flow directed from the center of rotation of the substrate toward the outer circumferential side thereof, whereby the air flow allows an increase in the flow rate of the air passing along the surface of the wavelength conversion element and flowing to the outer circumference of the substrate. The wavelength conversion element can therefore be sufficiently cooled.

In the first aspect described above, a configuration in which the wavelength conversion element is provided in a position shifted from the plurality of fins toward the center of rotation may be employed.

According to the configuration described above, since the wavelength conversion element is provided in a position shifted from the plurality of fins toward the center of rotation, a wide space where the plurality of fins are provided can be ensured, whereby the flow rate of the air flow can be increased.

In the first aspect described above, a configuration in which the plurality of fins are provided in a position shifted from the wavelength conversion element toward the center of rotation may be employed.

According to the configuration described above, since the plurality of fins are provided in a position shifted from the wavelength conversion element toward the center of rotation, the size of the plurality of fins can be reduced, whereby the part cost can be lowered.

According to a second aspect of the invention, an illuminator is provided. The illuminator includes a light source that emits light that belongs to a first wavelength band and the wavelength converter according to the first aspect described above that receives the light that belongs to the first wavelength band and outputs light that belongs to a second wavelength band.

The illuminator according to the second aspect, which includes the wavelength converter according to the first aspect described above, can sufficiently cool the wavelength conversion element and produce bright illumination light.

In the second aspect of the invention, a configuration in which the illuminator further includes an optical part the guides at least one of the light that belongs to the first wavelength band and the light that belongs to the second wavelength band, an optical part enclosure that accommodates the optical part, and a wall section that is provided as part of the optical part enclosure and faces the first surface but is separate therefrom by a predetermined distance may be employed.

According to the configuration described above, since the wall section provided as part of the optical part enclosure, which accommodates the optical part, faces the first surface and is separate therefrom by a predetermined distance, a channel is formed between the wall section and the first surface, whereby the air introduced through the opening of the air introduction channel readily flows along the first surface. As a result, stagnation or circulation flow of air heated by heat exchange that occurs on the first surface are suppressed, and the flow rate of low-temperature air introduced through the air introduction channel increases, whereby the wavelength conversion element can be sufficiently cooled.

In the second aspect described above, a configuration in which at least part of the wall section is formed integrally with the optical part enclosure may be employed.

According to the configuration described above, since at least part of the wall section is formed integrally with the optical part enclosure, the number of parts can be reduced.

In the second aspect of the invention, a configuration in which the air introduction channel is so provided as to pass through the wall section may be employed.

According to the configuration described above, low-temperature air can be directly introduced into a channel formed between the first surface and the wall section, whereby the wavelength conversion element can be sufficiently cooled.

According to a third aspect of the invention, a projector is provided. The projector includes the illuminator according to the second aspect, a light modulator that modulates illumination light from the illuminator in accordance with image information to form image light, and a projection system that projects the image light.

The projector according to the third aspect, which includes the illuminator according to the second aspect described above, can sufficiently cool the wavelength conversion element and display an image that is bright and excels in quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
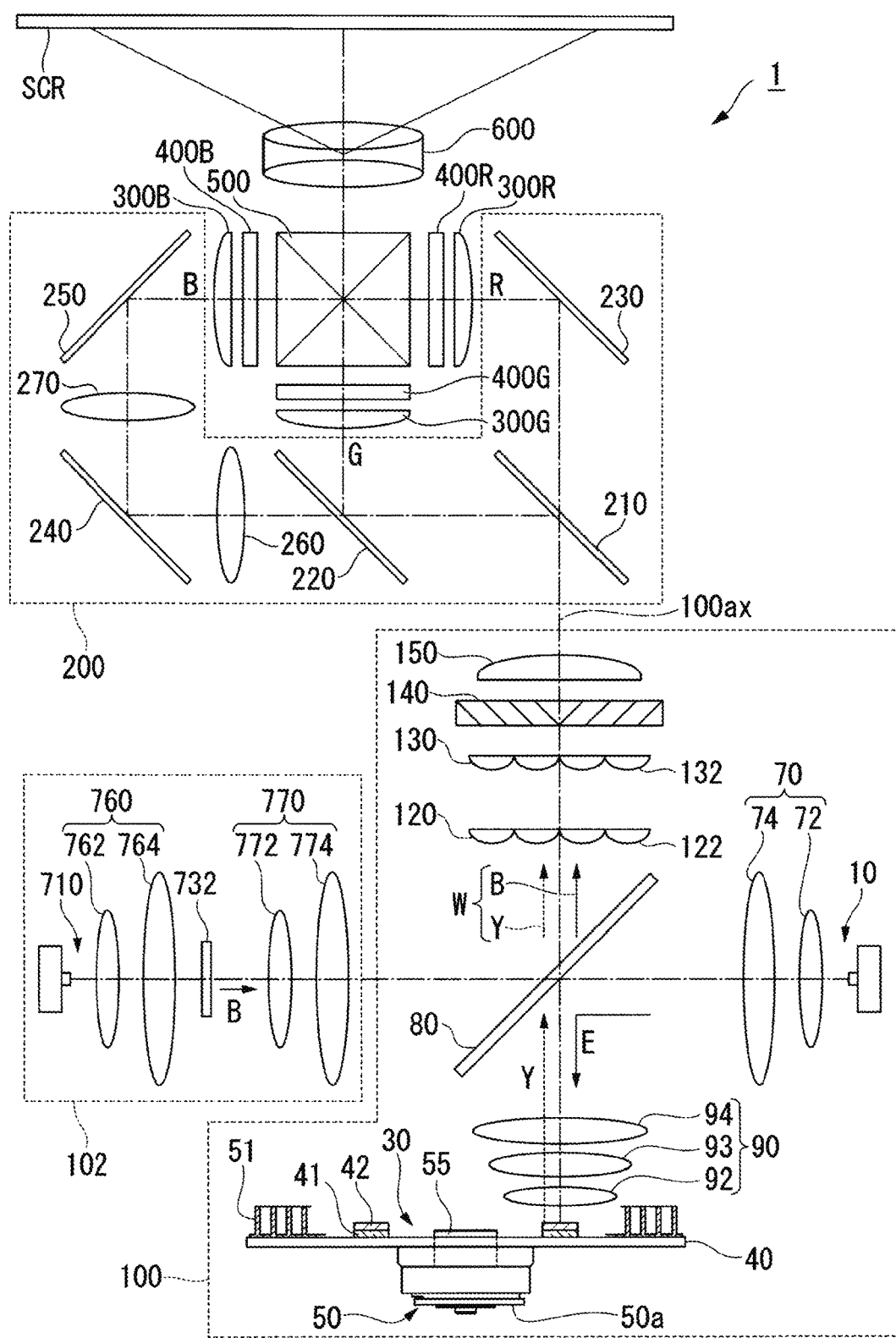
FIG. 1 is a top view showing the optical system of a projector according to an embodiment of the invention.

An embodiment of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

An example of a projector according to the present embodiment will be described. A projector 1 according to the present embodiment is a projection-type image display apparatus that displays color video images on a screen SCR (projection surface).

FIG. 1 is a top view showing the optical system of the projector 1 according to the present embodiment.

The projector 1 includes a first illuminator 100 (illuminator), a second illuminator 102, a color separation/light guide system 200, liquid crystal light modulators 400R, 400G, and 400B (light modulators) corresponding to red light, green light, and blue light, across dichroic prism 500, and a projection system 600, as shown in FIG. 1.

The first illuminator 100 includes a first light source 10 (light source), a collimator system 70, a dichroic mirror 80 (optical part), a collimator light collection system 90 (optical part), a rotary fluorescent plate 30 (wavelength converter), a first lens array 120, a second lens array 130, a polarization conversion element 140, and a superimposing lens 150.

The first light source 10 is formed of a semiconductor laser (light emitting device) that emits, as excitation light, blue light E that belongs to a first wavelength band (intensity of emitted light peaks at about 445 nm) and is formed of a laser beam. The first light source 10 may be formed of a single semiconductor laser or a large number of semiconductor lasers.

The first light source 10 can instead be a semiconductor laser that emits blue light having a wavelength other than 445 nm (460 nm, for example).

In the present embodiment, the first light source 10 is so disposed that the optical axis thereof is perpendicular to an illumination optical axis 100ax.

The collimator system 70 includes a first lens 72 and a second lens 74 and roughly parallelizes the light from the first light source 10. Each of the first lens 72 and the second lens 74 is formed of a convex lens.

The dichroic mirror 80 is so disposed in the optical path from the collimator system 70 to the collimator light collection system 90 as to intersect the optical axis of the first light source 10 and the illumination optical axis 100ax at an angle of 45°. The dichroic mirror 80 reflects blue light and transmits yellow fluorescence containing red light and green light.

The collimator light collection system 90 has a function of roughly focusing blue light E from the dichroic mirror 80 and causing the blue light E to be incident on a phosphor layer 42 of the rotary fluorescent plate 30 and a function of roughly parallelizing fluorescence emitted from the rotary fluorescent plate 30. The collimator light collection system 90 includes a first lens 92, a second lens 93, and a third lens 94. Each of the first lens 92, the second lens 93, and the third lens 94 is formed of a convex lens.

The rotary fluorescent plate 30 includes a motor 50 (rotating device), a disk 40 (substrate), a reflection film (reflection member), a phosphor layer (wavelength conversion element) 42, and a heat sink 51. The phosphor layer 42 is excited with the blue light E having a first wavelength and emitted from the first light source 10 and in turn emits fluorescence Y, which belongs to a second wavelength band. The surface of the phosphor layer 42 on which the blue light E is incident is also the surface through which the fluorescence Y exits. The fluorescence Y is yellow light containing red light and green light.

The second illuminator 102 includes a second light source 710, a light collection system. 760, a scatter plate 732, and a collimator system 770.

The second light source 710 is formed of the same semiconductor layer at that of the first light source 10 of the first illuminator 100.

The light collection system 760 includes a first lens 762 and a second lens 764. The light collection system 760 focuses the blue light from the second light source 710 at a point in the vicinity of the scatter plate 732. Each of the first lens 762 and the second lens 764 is formed of a convex lens.

The scatter plate 732 scatters the blue light B from the second light source 710 to form blue light B having a light distribution similar to the light distribution of the fluorescence Y emitted from the rotary fluorescent plate 30. The scatter plate 732 can, for example, be a ground glass plate made of optical glass.

The collimator system 770 includes a first lens 772 and a second lens 774 and roughly parallelizes the light from the scatter plate 732. Each of the first lens 772 and the second lens 774 is formed of a convex lens.

In the present embodiment, the blue light B from the second illuminator 102 is reflected off the dichroic mirror 80 and combined with the fluorescence Y having been emitted from the rotary fluorescent plate 30 and having passed through the dichroic mirror 80 to form white light W. The white light W is incident on the first lens array 120.

The first lens array 120 has a plurality of first lenslets 122 for dividing the light having passed through the dichroic mirror 80 into a plurality of sub-light fluxes. The plurality of first lenslets 122 are arranged in a matrix in a plane perpendicular to the illumination optical axis 100ax.

The second lens array 130 has a plurality of second lenslets 132 corresponding to the plurality of first lenslets 122 of the first lens array 120. The second lens array 130, along with the superimposing lens 150, forms images of the first lenslets 122 of the first lens array 120 in the vicinity of image formation areas of the liquid crystal light modulators 400R, 400G, and 400B. The plurality of second lenslets 132 are arranged in a matrix in a plane perpendicular to the illumination optical axis 100ax.

The polarization conversion element 140 converts each of the divided sub-light fluxes from the first lens array 120 into linearly polarized light. The polarization conversion element 140 has a polarization separation layer, a reflection layer, and a retardation film. The polarization separation layer directly transmits one linearly polarized light component of the polarized light components contained in the light from the rotary fluorescent plate 30 and reflects another linearly polarized light component toward the reflection layer.

The reflection layer reflects the other linearly polarized light component reflected off the polarization separation layer in the direction parallel to the illumination optical axis 100ax. The retardation film converts the other linearly polarized light component reflected off the reflection layer into the one linearly polarized light component.

The superimposing lens 150 collects the sub-light fluxes from the polarization conversion element 140 and superimposes the sub-light fluxes on one another in the vicinity of the image formation areas of the liquid crystal light modulators 400R, 400G, and 400B. The first lens array 120, the second lens array 130, and the superimposing lens 150 form an optical integration system that homogenizes the in-plane optical intensity distribution of the light from the rotary fluorescent plate 30.

The color separation/light guide system 200 includes dichroic mirrors 210 and 220, reflection mirrors 230, 240, and 250, and relay lenses 260 and 270. The color separation/light guide system 200 separates the white light W from the first illuminator 100 and the second illuminator 102 into red light R, green light G, and blue light B and guides the red light R, the green light G, and the blue light B to the corresponding liquid crystal light modulators 400R, 400G, and 400B, respectively.

Field lenses 300R, 300G, and 300B are disposed between the color separation/light guide system 200 and the liquid crystal light modulators 400R, 400G, 400B.

The dichroic mirror 210 is a dichroic mirror that transmits the red light component and reflects the green light component and the blue light component.

The dichroic mirror 220 is a dichroic mirror that reflects the green light component and transmits the blue light component.

The reflection mirror 230 is a reflection mirror that reflects the red light component.

The reflection mirrors 240 and 250 are reflection mirrors that reflect the blue light component.

The red light having passed through the dichroic mirror 210 is reflected off the reflection mirror 230, passes through the field lens 300R, and is incident on the image formation area of the liquid crystal light modulator 400R for red light.

The green light reflected off the dichroic mirror 210 is further reflected off the dichroic mirror 220, passes through the field lens 300G, and is incident on the image formation area of the liquid crystal light modulator 400G for green light.

The blue light having passed through the dichroic mirror 220 travels via the relay lens 260, the light-incident-side reflection mirror 240, the relay lens 270, the light-exiting-side reflection mirror 250, and the field lens 300B and is incident on the image formation area of the liquid crystal light modulator 400B for blue light.

The liquid crystal light modulators 400R, 400G, and 400B modulate the color light flexes incident thereon in accordance with image information to form images corresponding to the color light fluxes. Although not shown, light-incident-side polarizers are disposed between the field lenses 300R, 300G, 300B and the liquid crystal light modulators 400R, 400G, 400B, and light-exiting-side polarizers are disposed between the liquid crystal light modulators 400R, 400G, 400B and the cross dichroic prism 500.

The cross dichroic prism 500 is an optical element that combines the image light fluxes outputted from the liquid crystal light modulators 400R, 400G, and 400B with one another to form a color image.

The cross dichroic prism 500 is formed by bonding four rectangular prisms to each other and thus has a roughly square shape in a plan view, and dielectric multilayer films are formed on the roughly X-letter-shaped interfaces between the bonded rectangular prisms.

The color image having exited out of the cross dichroic prism 500 is enlarged and projected by the projection system 600 and forms an image on the screen SCR.

The configurations of the rotary fluorescent plate 30 and the first illuminator 100 will next be described with reference to FIGS. 2 to 6.

Figure 2:
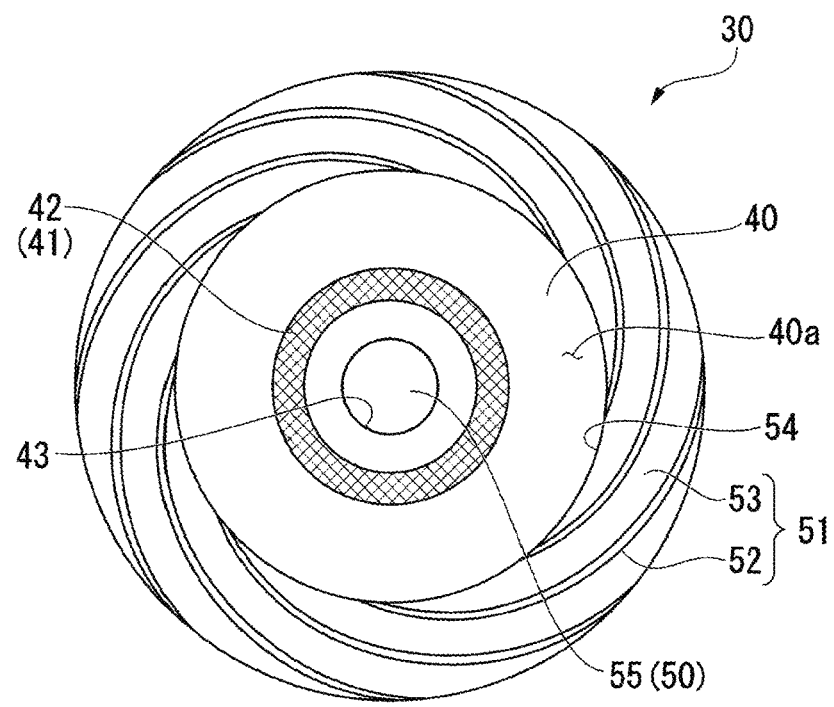
FIG. 2 is a configuration diagram of a rotary fluorescent plate according to the present embodiment viewed from the side facing a first surface of a disk.
Figure 3:
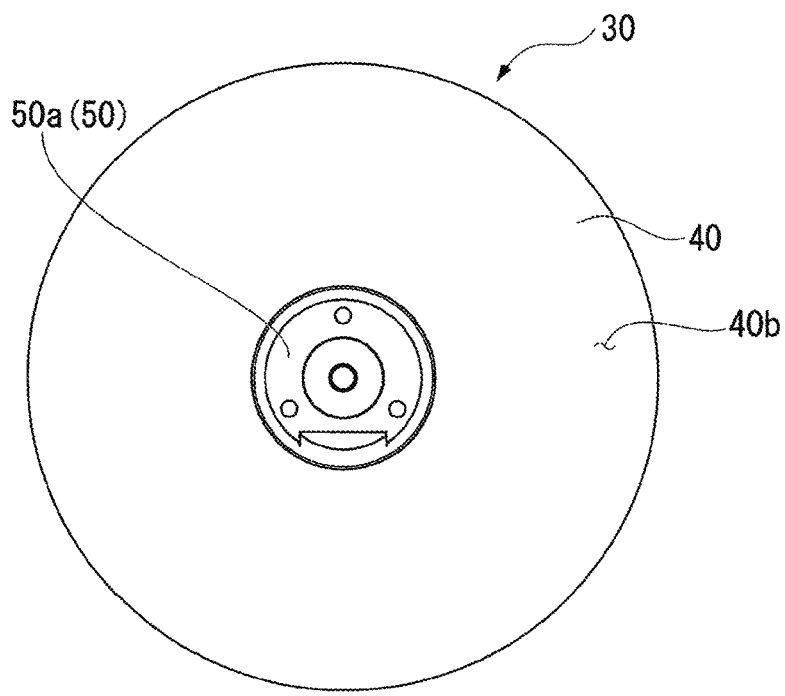
FIG. 3 is a configuration diagram of the rotary fluorescent plate according to the present embodiment viewed from the side facing a second surface of the disk.
Figure 4:
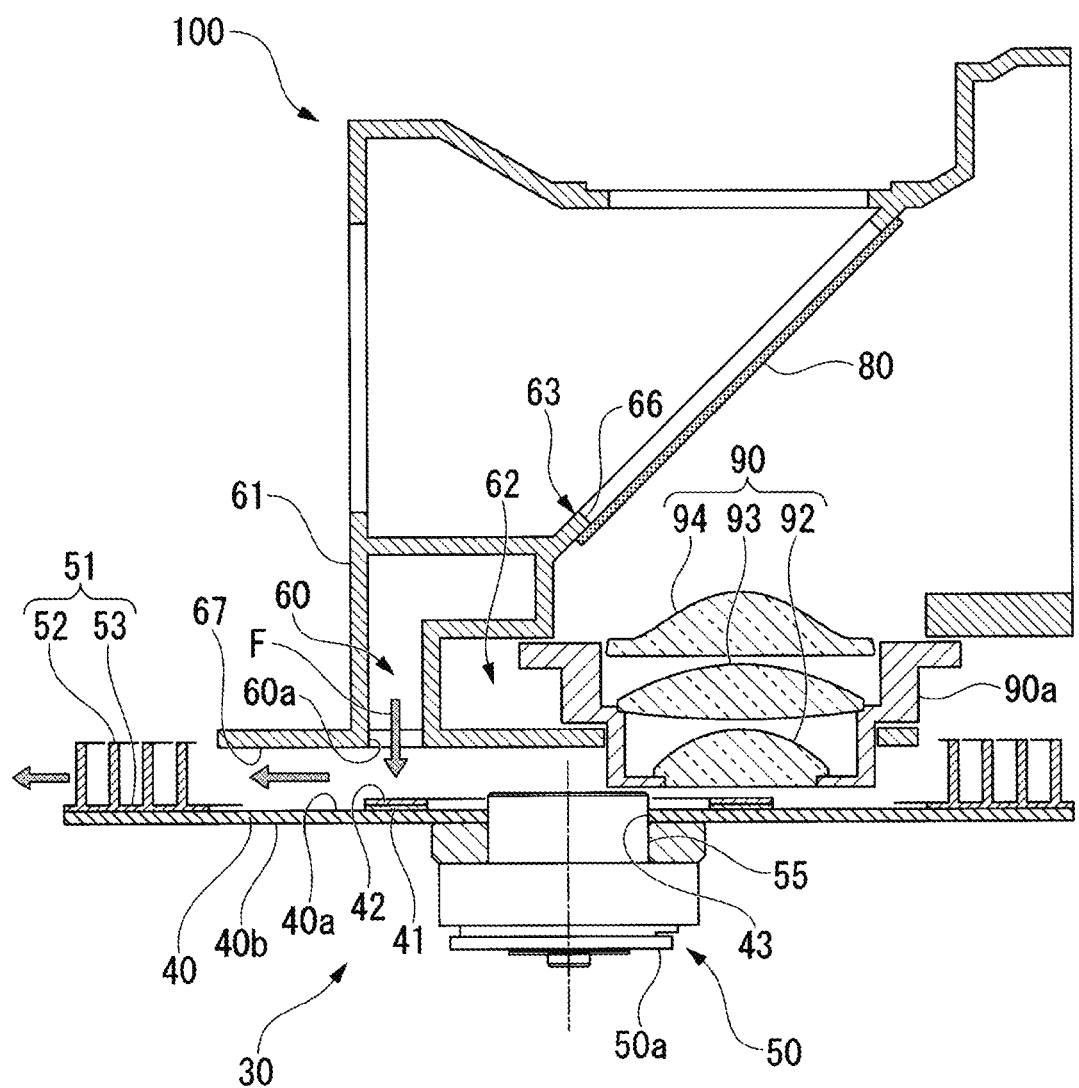
FIG. 4 is a cross-sectional view of a first illuminator according to the present embodiment.
Figure 5:
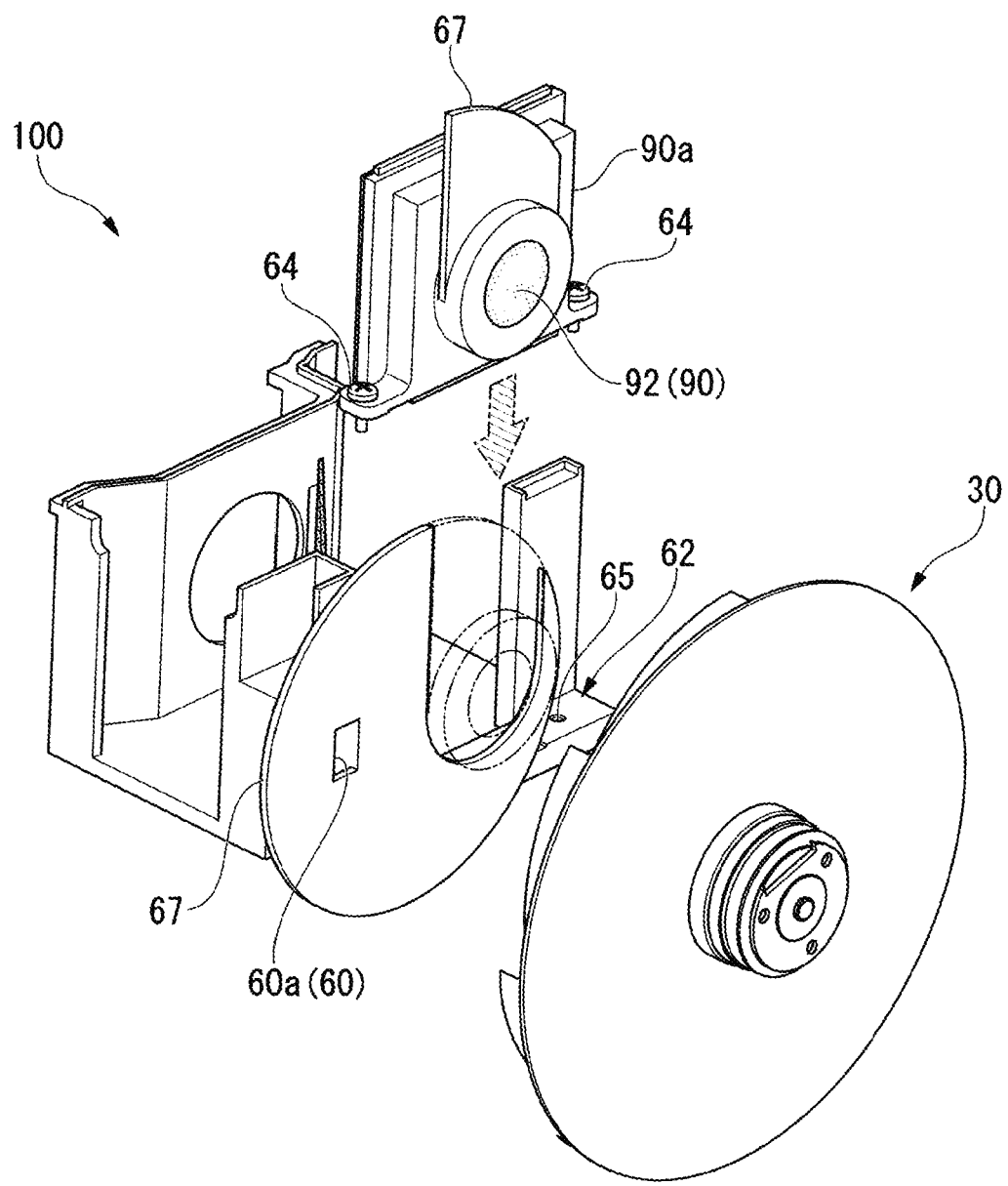
FIG. 5 is an exploded perspective view of the first illuminator according to the present embodiment.
Figure 6:
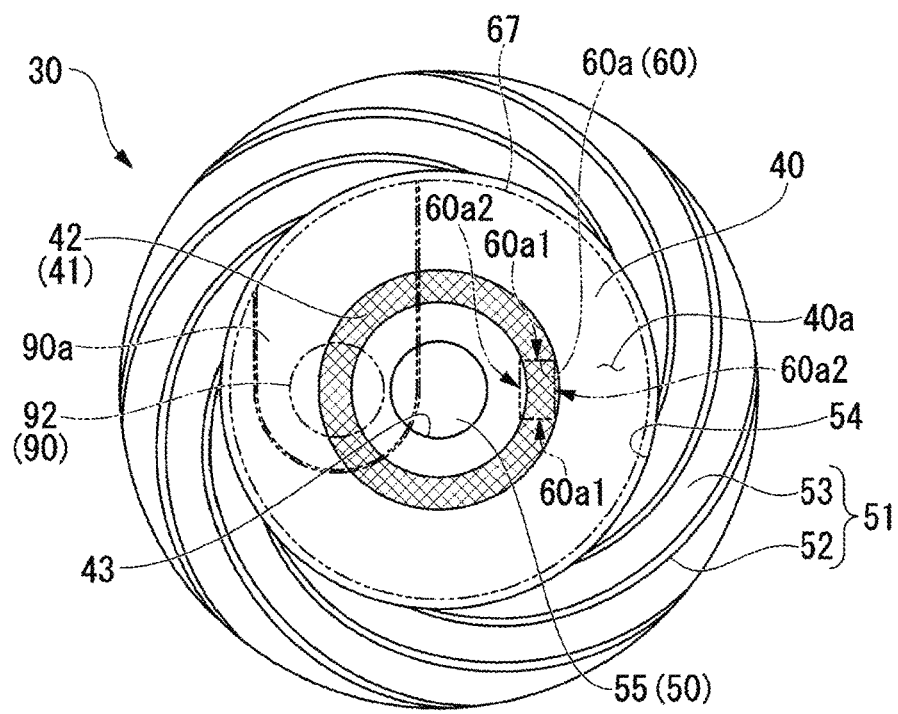
FIG. 6 shows the arrangement of an opening of an air introduction channel with respect to the rotary fluorescent plate according to the present embodiment.

FIG. 2 is a configuration diagram of the rotary fluorescent plate 30 according to the present embodiment viewed from the side facing a first surface 40a of the disk 40. FIG. 3 is a configuration diagram of the rotary fluorescent plate 30 according to the present embodiment viewed from the side facing a second surface 40b of the disk 40. FIG. 4 is a cross-sectional view of the first illuminator 100 according to the present embodiment. FIG. 5 is an exploded perspective view of the first illuminator 100 according to the present embodiment. FIG. 6 shows the arrangement of an opening 60a of an air introduction channel 60 with respect to the rotary fluorescent plate 30 according to the present embodiment.

The rotary fluorescent plate 30, specifically, the disk 40 having the phosphor layer 42 is rotated by the motor 50. The motor 50 is, for example, an outer-rotor-type motor. The phosphor layer 42 and the heat sink 51 are both provided on the first surface 40a of the disk 40, as shown in FIG. 2.

On the other hand, a main body 50a (stator) of the motor 50 is provided on the second surface 40b of the disk 40, which faces away from the first surface 40a.

The motor 50 has a cylindrical hub 55, as shown in FIG. 2. The hub 55 forms the rotor and rotates relative to the main body 50a. The central axis of the hub 55 is the center of rotation of the motor 50.

The disk 40 is formed, for example, of a disk made of a metal that excels in heat dissipation, such as aluminum and copper. The disk 40 has a first opening 43. The first opening 43 is formed at the center of the disk 40 and has a diameter roughly equal to that of the hub 55 so that the hub 55 can be fit in the first opening 53.

The phosphor layer 42 is formed, for example, of a layer containing $(Y,Gd)_3(Al,Ga)_5O_{12}:Ce$, which is a YAG-based phosphor.

The reflection film 41 is provided between the phosphor layer 42 and the disk 40 and so designed as to efficiently reflect the fluorescence Y (see FIG. 1) produced by the excitation of the phosphor layer 42. The reflection film 41 is formed of a film having reflectance at least higher than that of the disk 40 and made, for example, of silver.

Each of the reflection film 41 and the phosphor layer 42 has the shape of a ring.

The heat sink 51 is made, for example, of a metal material that excels in heat dissipation, such as aluminum, copper, silver, and iron. The heat sink 51 is fixed to the first surface 40a of the disk 40 via an adhesive. The adhesive can, for example, be a silicon-based adhesive, which has high heat conductivity. The heat sink 51 includes a plurality of fins 52 and a flat plate 53, as shown in FIG. 2.

The plurality of fins 52 are formed integrally with the flat plate 53. The plurality of fins 52 are so arranged as to surround the circumference of the hub 55. Each of the plurality of fins 52 is formed of a protruding member so curved in a swirl shape extending from the radially outer side of the disk 40 toward the radially inner side thereof in a plan view, as shown in FIG. 2. According to the configuration described above, when the disk 40 rotates, air flow directed outward from the center of rotation of the motor 50 can be formed.

The flat plate 53 has an annular shape and has a second opening 54. The second opening 54 is formed at the center of the flat plate 53 and has a diameter greater than the diameter of the first opening 43. The hub 55 and the phosphor layer 42 are disposed in the second opening 54. That is, the phosphor layer 42 is provided in a position shifted from the plurality of fins 52 toward the center of rotation of the motor 50.

The first surface 40a of the rotary fluorescent plate 30 having the configuration described above faces an opening 60a of an air introduction channel 60, through which air (labeled with reference character F in FIG. 4) for cooling the phosphor layer 42, is introduced, as shown in FIG. 4. The air introduction channel 60 is provided in an optical part enclosure 61. The optical part enclosure 61 is an enclosure that accommodates the collimator light collection system 90, the dichroic mirror 80, and other optical parts and forms the first illuminator 100.

The optical part enclosure 61 includes a first attachment section 62, to which the collimator light collection system 90 is attached, and a second attachment section 63, to which the dichroic mirror 80 is attached. The collimator light collection system 90 is a unit part formed of the first lens 92, the second lens 93, and the third lens 94 unitized by using a frame 90a, as shown in FIG. 4.

The collimator light collection system 90 in the form of the unit part is attached to the first attachment section 62 with screws 64, as shown in FIG. 5. Threaded holes 65, into which the screws 64 are screwed, are formed in the first attachment section 62. On the other hand, the second attachment section 63 has the shape of a plate having an opening 66 formed therein, as shown in FIG. 4. The dichroic mirror 80 is fixed, for example, to a circumferential edge portion around the opening 66 via an adhesive or any other fastening component.

The optical part enclosure 61 is provided with a wall section 67, which faces the first surface 40a with a predetermined distance therebetween. The wall section 67 has the shape of a disk, as shown in FIG. 5. At least part of the wall section 67 is integrated with the optical part enclosure 61. In the present embodiment, part of the wall section 67 is formed integrally with the frame 90a of the collimator light collection system 90, and the remainder of the wall section 67 is formed integrally with the optical part enclosure 61. That is, the optical part enclosure 61 and the frame 90a together form the wall section 67 having the shape of a disk.

The wall section 67 is provided in a position shifted from the plurality of fins 52 toward the center of rotation, as shown in FIG. 6. The wall section 67 has the outer diameter slightly smaller than the inner diameter (second opening 54) of the flat plate 53 and covers roughly the entire area inside the second opening 54. The wall section 67 is so provided as to be roughly parallel to the first surface 40a and separate therefrom by a distance slightly shorter than the length from the first surface 40a to the front ends of the fins 52, as shown in FIG. 4.

The air introduction channel 60 is so provided as to pass through the wall section 67. That is, the opening 60a, which is the exit of the air introduction channel 60, is provided in the wall section 67. An entrance opening of the air introduction channel 60 is provided at a location other than the wall section 67 (bottom surface of optical part enclosure 61, for example) and naturally introduces air inside or outside the projector 1.

Air may instead be forcibly introduced with a fan or any other component into the air introduction channel 60.

At least part of the opening 60a is provided in a position shifted from the phosphor layer 42 toward the center of rotation of the motor 50, as shown in FIG. 6. The opening 60a has a rectangular shape, and each short side 60a1 of the opening 60a has a width roughly equal to the width of the phosphor layer 42. The opening 60a further has long sides 60a2, which are perpendicular to the short sides 60a1, and one of the long sides 60a2 is so provided as to be located in a position shifted from the phosphor layer 42 toward the center of rotation. Conversely, the short sides 60a1 and the other or outer long side 60a2 of the opening 60a are so provided as to face the phosphor layer 42.

In the rotary fluorescent plate 30 having the configuration described above, when the blue light E formed of a laser beam is incident on the phosphor layer 42 via the collimator light collection system 90, heat is generated in the phosphor layer 42. The disk 40 is rotated by the motor 50 so that the position on the phosphor layer 42 where the blue light E is incident successively changes. Therefore, a situation in which the same portion of the phosphor layer 42 is intensively irradiated with the blue light E and is therefore undesirably degraded is avoided. Part of the heat generated in the phosphor layer 42 is dissipated via the heat sink 51.

When the disk 40 is rotated by the motor 50, the plurality of fins 52, which are provided on the first surface 40a of the disk 40, rotate, and the air flow directed from the center of rotation of the disk 40 toward the outer circumferential side thereof is induced (see FIG. 4). The air flow causes air to be naturally sucked through the entrance of the air introduction channel 60, and the air is introduced through the opening 60a of the air introduction channel 60. Since the opening 60a faces the first surface 40a, the air introduced through the opening 60a flows along the first surface 40a and directly cools the phosphor layer 42 provided on the first surface 40a.

As described above, according to the present embodiment, the phosphor layer 42 and the plurality of fins 52 are provided on the same first surface 40a, and the opening 60a of the air introduction channel 60 is so provided as to face the first surface 40a, whereby air is allowed to actively flow to the surface of the phosphor layer 42 for sufficient cooling of the phosphor layer 42.

Further, in the present embodiment, at least part of the opening 60a is provided in a position shifted from the phosphor layer 42 toward the center of rotation of the motor 50, as shown in FIG. 6. The configuration allows air to be introduced to a portion shifted from the phosphor layer 42 toward the center of rotation of the motor 50. When the plurality of fins 52 rotate, resultant centrifugal force induces air flow directed from the center of rotation of the disk 40 toward the outer circumferential side thereof, whereby the air flow allows an increase in the flow rate of the air passing along the surface of the phosphor layer 42 and flowing to the outer circumference of the disk 40.

Further, in the rotary fluorescent plate 30 having the configuration described above, since the phosphor layer 42 is provided in a position shifted from the plurality of fins 52 toward the center of rotation, a wide space where the plurality of fins 52 are provided can be ensured, whereby the flow rate of the air flow can be increased.

As described above, according to the rotary fluorescent plate 30 of the present embodiment, the flow rate of the air passing along the surface of the phosphor layer 42 and flowing to the outer circumference of the rotary fluorescent plate 30 can be increased, whereby the phosphor layer 42 can be sufficiently cooled.

In addition to the above, the first illuminator 100 having the configuration described above includes the optical part enclosure 61, which accommodates the collimator light collection system 90 and the dichroic mirror 80, which guide the blue light E, which belongs to the first wavelength band, and the fluorescence Y, which belongs to the second wavelength band, and the wall section 67, which is provided in the optical part enclosure 61 and faces the first surface 40a and is separate therefrom by a predetermined distance. According to the configuration, since the wall section 67, which is provided as part of the optical part enclosure 61, which accommodates the optical parts, faces the first surface 40a and is separate therefrom by a predetermined distance, a channel is formed between the wall section 67 and the first surface 40a, whereby the air introduced through the opening 60a of the air introduction channel 60 readily flows along the first surface 40a.

As a result, stagnation or circulation flow of air heated by heat exchange that occurs on the first surface 40a are suppressed, and the flow rate of low-temperature air introduced through the air introduction channel 60 increases, whereby the phosphor layer 42 can be efficiently cooled.

The air introduction channel 60 is so provided as to pass through the wall section 67. According to the configuration, the low-temperature air can be directly introduced into the channel formed between the first surface 40a and the wall section 67, whereby the phosphor layer 42 can be efficiently cooled.

At least part of the wall section 67 is formed integrally with the optical part enclosure 61, as shown in FIG. 5. The formation of the wall section 67 integrally with the optical part enclosure 61 allows reduction in the number of parts, which contributes to facilitation of assembly and cost reduction.

As described above, according to the present embodiment, employing the rotary fluorescent plate 30, which includes the motor 50, the disk 40 rotated by the motor 50, and the phosphor layer 42 and the plurality of fins 52 provided on the first surface 40a of the disk 40, with the first surface 40a so provided as to face the opening 60a of the air introduction channel 60, through which air for cooling the phosphor layer 42 is introduced, allows the phosphor layer 42 to be efficiently cooled. The first illuminator 100 including the rotary fluorescent plate 30 can produce reliable, bright illumination light (white light W). The projector 1 including the first illuminator 100 can display an excellent quality image.

The invention is not necessarily limited to the embodiment described above, and a variety of changes can be made thereto to the extent that the changes do not depart from the substance of the invention.

Figure 7:
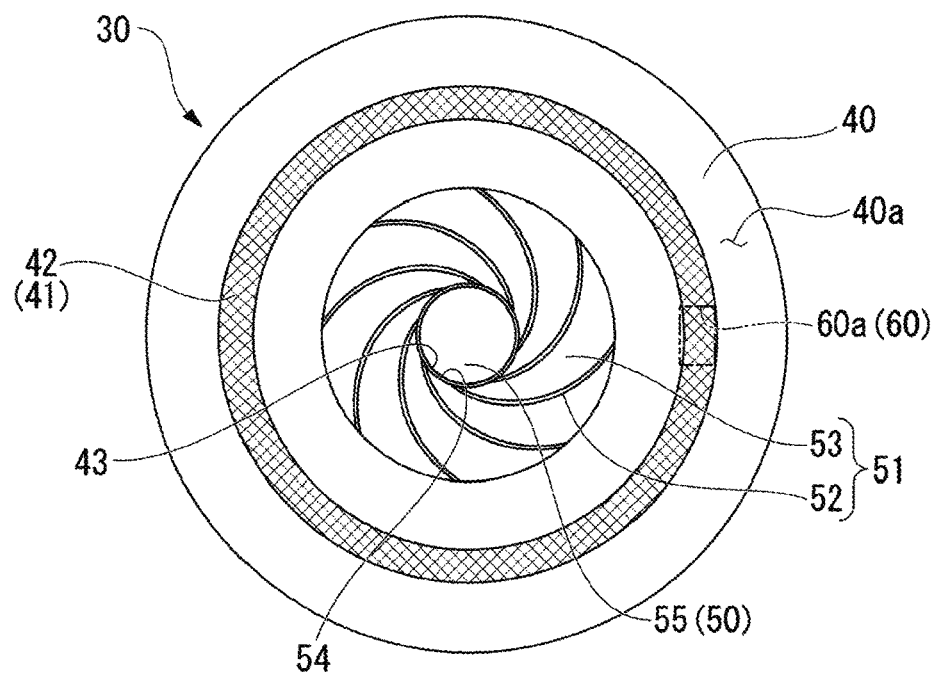
FIG. 7 is a configuration diagram of a rotary fluorescent plate according to another embodiment viewed from the side facing a first surface of a disk.

FIG. 7 is a configuration diagram of a rotary fluorescent plate 30 according to another embodiment viewed from the side facing the first surface 40a of the disk 40.

The rotary fluorescent plate 30 shown in FIG. 7 differs from the rotary fluorescent plate 30 according to the embodiment described above in that the plurality of fins 52 are provided in a position shifted from the phosphor layer 42 toward the center of rotation.

According to the configuration, since the plurality of fins 52 are provided in a position shifted from the phosphor layer 42 toward the center of rotation, the size of the plurality of fins 52 can be reduced, whereby the part cost can be lowered.

Further, the above embodiment has been described with reference to the case where the substrate is formed of the disk 40 made of a metal, and the surface of the phosphor layer 42 on which the blue light E is incident also serves as the surface through which the fluorescence Y exits, but the embodiment described above is not necessarily employed. For example, the disk 40 may be made of a material that transmits light, such as sapphire, the blue light E may be caused to be incident through the second surface 40b of the disk 40, on which no phosphor layer 42 is disposed, and the fluorescence Y may be caused to exit through the first surface 40a, on which the phosphor layer 42 is disposed. That is, what is called a light transmissive configuration may instead be employed.

Further, the above embodiment has been described with reference to the configuration in which part of the opening 60a is provided in a position shifted from the phosphor layer 42 toward the center of rotation of the motor 50. Instead, a configuration in which the entire opening 60a is provided in a position shifted from the phosphor layer 42 toward the center of rotation of the motor 50 may be employed.

Further, the above embodiment has been described with reference to the configuration in which part of the wall section 67 is formed integrally with the optical part enclosure 61. Instead, a configuration in which the entire wall section 67 is formed integrally with the optical part enclosure 61 may be employed. Moreover, for example, a configuration in which the entire wall section 67 is formed integrally with the frame 90a and is a member completely different from the optical part enclosure 61 may be employed.

Further, the above embodiment has been described with reference to the configuration in which the wall section 67 has an outer diameter slightly smaller than the inner diameter (second opening 54) of the flat plate 53, but the embodiment described above is not necessarily employed. For example, a configuration in which the wall section 67 is so formed as to be greater than the inner diameter of the flat plate 53 so that the wall section 67 overlaps with part of the fins 52 when viewed along the direction of the central axis of rotation of the motor 50 may be employed.

Further, the projector 1 including the three liquid crystal light modulators 400R, 400G, and 400B is presented by way of example in the embodiment described above. The invention is also applicable to a projector in which a single liquid crystal light modulator is used to display color video images. Further, a digital mirror device (DMD) may be used as each of the light modulators. Moreover, a quantum rod may be used as the wavelength conversion element.

What is claimed is:

1. A wavelength converter comprising:
    a rotating device;
    a substrate rotated by the rotating device;
    a wavelength conversion element provided on a first surface of the substrate; and
    a plurality of fins provided on the first surface of the substrate such that the plurality of fins and the wavelength conversion element are provided on the same side of the substrate,
    wherein
        a portion of the wavelength conversion element provided on the first surface at least partially faces an opening of an air introduction channel through which air for cooling the wavelength conversion element is introduced and the portion at least partially overlaps the opening in a plan view,
        the wavelength conversion element is in a shape of a ring,
        a radial direction of the wavelength conversion element is perpendicular to and extends from a center axis of the wavelength conversion element toward an outer circumference of the wavelength conversion element, and
        the wavelength conversion element has a width in the radial direction that is substantially equal to a width of the opening of the air introduction channel in the radial direction.

2. The wavelength converter according to claim 1, wherein at least part of the opening is provided in a position shifted from the wavelength conversion element toward a center of rotation of the rotating device.

3. The wavelength converter according to claim 1, wherein the wavelength conversion element is provided in a position shifted from the plurality of fins toward a center of rotation of the rotating device.

4. The wavelength converter according to claim 1, wherein the plurality of fins are provided in a position shifted from the wavelength conversion element toward a center of rotation of the rotating device.

5. An illuminator comprising:
    a light source that emits light that belongs to a first wavelength band; and
    the wavelength converter according to claim 1 that receives the light that belongs to the first wavelength band and outputs light that belongs to a second wavelength band.

6. An illuminator comprising:
    a light source that emits light that belongs to a first wavelength band; and
    the wavelength converter according to claim 2 that receives the light that belongs to the first wavelength band and outputs light that belongs to a second wavelength band.

7. An illuminator comprising:
    a light source that emits light that belongs to a first wavelength band; and
    the wavelength converter according to claim 3 that receives the light that belongs to the first wavelength band and outputs light that belongs to a second wavelength band.

8. An illuminator comprising:
    a light source that emits light that belongs to a first wavelength band; and
    the wavelength converter according to claim 4 that receives the light that belongs to the first wavelength band and outputs light that belongs to a second wavelength band.

9. The illuminator according to claim 5, further comprising:
    an optical part that guides at least one of the light that belongs to the first wavelength band and the light that belongs to the second wavelength band;
    an optical part enclosure that accommodates the optical part; and
    a wall section that is provided as part of the optical part enclosure and faces the first surface but is separate therefrom by a predetermined distance.

10. The illuminator according to claim 9, wherein at least part of the wall section is formed integrally with the optical part enclosure.

11. The illuminator according to claim 9, wherein the air introduction channel is so provided as to pass through the wall section.

12. A projector comprising:
    the illuminator according to claim 5;
    a light modulator that modulates illumination light from the illuminator in accordance with image information to form image light; and
    a projection system that projects the image light.

13. A projector comprising:
    the illuminator according to claim 9;
    a light modulator that modulates illumination light from the illuminator in accordance with image information to form image light; and
    a projection system that projects the image light.

14. A projector comprising:
    the illuminator according to claim 10;
    a light modulator that modulates illumination light from the illuminator in accordance with image information to form image light; and
    a projection system that projects the image light.

15. A projector comprising:
    the illuminator according to claim 11;
    a light modulator that modulates illumination light from the illuminator in accordance with image information to form image light; and
    a projection system that projects the image light.

16. The wavelength converter according to claim 1, wherein the wavelength conversion element is positioned with respect to the opening such that the air for cooling the wavelength conversion element is introduced in a direction perpendicular to a surface of the wavelength conversion element.

17. The wavelength converter according to claim 16, wherein the wavelength conversion element is positioned such that the wavelength conversion element and the opening are shifted away from a center of rotation of the rotating device.

18. The wavelength converter according to claim 1, wherein the plurality of fins make an air flow from the opening of the air introduction channel.

19. The wavelength converter according to claim 1, wherein each of the plurality of tins is curved with a swirl shape extending from a radially outer side of the substrate toward a radially inner side of the substrate in the plan view.

20. The illuminator according to claim 9,
wherein the air introduction channel includes an entrance opening and the opening provided on the wall section, which is an exit of the air introduction channel, and
wherein the entrance opening is provided at a location other than the wall section and introduces air inside or outside of the illuminator.

21. The wavelength converter according to claim 1, wherein when the substrate and the plurality of fins rotate, the plurality of fins induce an air flow directed from a rotation center of the substrate toward an outer circumferential side of the substrate.

22. The wavelength converter according to claim 21,
wherein the air introduction channel includes an entrance opening and the opening provided on a wall section of an optical part enclosure that accommodates an optical part, the opening corresponding to an exit of the air introduction channel, and
wherein the air flow causes air to be sucked through the entrance opening of the air introduction channel and causes the sucked air to introduce through the entrance opening toward the wavelength conversion element.

23. A wavelength converter for working with an optical device having an air introduction channel, comprising:
a rotating device;
a substrate configured to be rotated by the rotating device, and having a rotation axis;
a wavelength conversion element provided on a first surface of the substrate, and configured to convert wavelength of incident light; and
a plurality of fins provided on the first surface of the substrate,
wherein
an opening of the air introduction channel through which air for cooling the wavelength conversion element is introduced faces the first surface of the substrate,
the opening is disposed, in a plan view, with respect to the rotation axis of the substrate at an opposite side to a portion of the wavelength conversion element on which the light is incident,
the wavelength conversion element is in a shape of a ring,
a radial direction of the wavelength conversion element is perpendicular to and extends from the rotation axis toward an outer circumference of the wavelength conversion element, and
the wavelength conversion element has a width in the radial direction that is substantially equal to a width of the opening of the air introduction channel in the radial direction.

* * * * *